(No Model.)
C. A. G. WINTHER.
STEAM GAGE TUBING.
No. 500,830. Patented July 4, 1893.
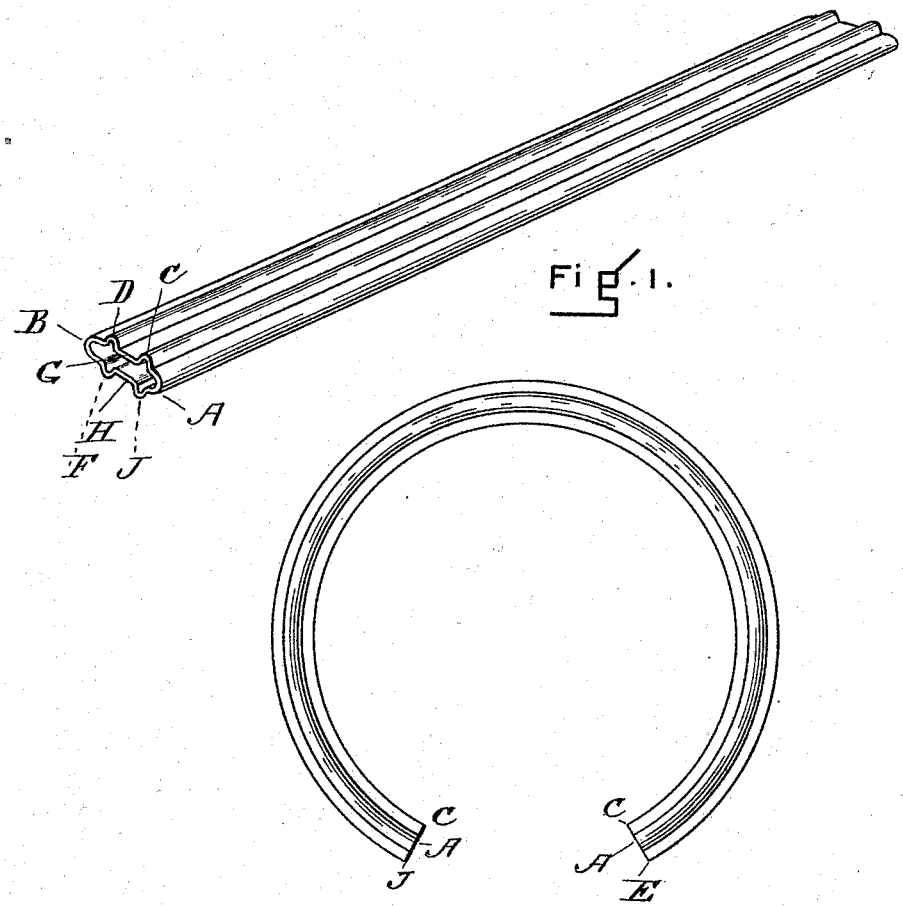

UNITED STATES PATENT OFFICE.

CHARLES A. G. WINTHER, OF SOMERVILLE, ASSIGNOR OF ONE-HALF TO THE STAR BRASS MANUFACTURING COMPANY, OF BOSTON, MASSACHUSETTS.

STEAM-GAGE TUBING.

SPECIFICATION forming part of Letters Patent No. 500,830, dated July 4, 1893.

Application filed March 6, 1893. Serial No. 464,698. (No model.)

*To all whom it may concern:*

Be it known that I, CHARLES A. G. WINTHER, a citizen of the United States of America, residing at Somerville, in the county of Middlesex and State of Massachusetts, have invented a new and useful Improvement in Steam-Gage Tubing, of which the following, reference being had to the accompanying drawings, is a full, clear, and exact description, sufficient to enable others skilled in the art to make and use my invention without further or other invention on their part.

In the drawings, Figure 1 is a perspective view of a blank for a steam gage tube, embodying this invention. Fig. 2 is an elevation of such a tube bent into a form in which it will be put in use. This form, however, may include more or less of a complete circle without departing from the spirit of the invention. Fig. 3 is a transverse section on an enlarged scale of a steam gage tube embodying this invention, and Fig. 4 is a transverse section of a steam gage tube embodying a contrivance which was patented by me. See Letters Patent No. 466,547, of January 5, 1892, in which a reinforcement of the walls of the steam gage tube was made by thickening the wall of the tube.

In the manufacture of tubes of this sort, it was discovered that such tubes could not be made of homogeneous texture very readily and that the metal was more liable to be injured in the course of manufacture than the metal of the ordinary tube. As the hollow tube or steam spring of a pressure or vacuum gage is really the most important part of its structure and requires to be just as good in a cheap gage as it is in an elaborate one and the durability of a gage depends upon the lasting quality of this spring, and its accuracy depends chiefly on the quality of the spring, any improvement in the spring which relieves it from defects or renders it more accurate or more durable is a vital and fundamental improvement in the gage itself.

The ordinary steam gage tube consisting of a flattened bronze tube bent into a curve and given by working a spring temper will often set, or have its elastic limit changed by pressure or by exposure to heat, which more or less anneals the spring so that the gage requires re-adjustment to the new conditions of the spring. In such a case, the gage until readjusted, is useless and an annoyance and reliance upon it is the source of danger.

This tube which I have invented is a tube of comparatively uniform thickness throughout its length and is longitudinally corrugated; by preference the corrugations are on what may be called the long sides of the tube. They may be of almost any number, and they may be of almost any transverse section. They may be separated by flattened spaces, or they may be corrugations without any considerable interval between them. Probably as convenient a form for the purpose of manufacture and putting in shape for use is a form of which the corrugation is shown in Fig. 3. But it must be understood, as already said, that the number and shape of the corrugations and the distance between them are not essential. If, however, only one corrugation is used, it should be in the center of the long side; if more than one corrugation is used, on the same side of the tube, the corrugation should be symmetrically disposed on either side of the center of the long side. The corrugations may be on both of the long sides or on only one of them.

In Figs. 1, 2 and 3 the tube is supposed to be of a flattened character, of which the curvatures at the outside edges are marked A and B. These curvatures are the short sides of the flattened tube or in other words, the curvatures at the ends of the long axis of the ellipse, which is theoretically the cross-section of the steam gage tube.

The long sides of the tube are the parts above and below the line which would join the letters A and B. These long sides have longitudinal corrugations C and D upon one of them, and F and J upon the other. These corrugations are separated from each other by the intermediate space G between the corrugations D and C, and H between the corrugations F and J so that the long sides of the tube are marked B D G C A and B F H J A.

The tube, it will be seen, is of even thickness and can be readily produced in this form by the ordnary means of making either seamless drawn or brazed tubing. The difference between such a tube as this and the tube with reinforced sides can be seen by comparing Fig. 3 with Fig. 4. In Fig. 4 E is the cavity of the tube and V are the reinforcements one on each of the long sides. These reinforcements, being made at the same time as the other part of the tube, will not be subjected in the course of manufacture to the same pressure or the same work as the other parts of the walls of the tube, and consequently, the conditions of manufacture to get a perfectly homogeneous tube require much greater nicety than to make a corrugated tube such as I have described.

Such a tube as this of mine is much stronger for the same thickness and weight of metal, it has much more elasticity, and greater delicacy and susceptibility and it retains its elasticity and its modulus of elasticity much better than the plain tubing, and is far less likely to set, either under the influence of strain or under thermal influences than the plain tube.

I am familiar with the tubes shown in the original Bourdon patent in this country, No. 9,163, of August 3, 1852, and particularly with the cross-sections illustrated in said patent at Figs. 7 to 14. I do not claim anything therein shown and described.

The Bourdon tubes made with what may be called three or four wings of comparatively equal length, the angles between which wings approach very closely to each other near the center of form of such wing shaped tube, is an unsuitable tube for a gage or manometer, unless it is malformed or put in tension by twisting it around its longitudinal axis instead of curving it around an axis transverse to the vertical axis of the tube. Where the oval flattened tube or the flattened tube of any transverse section derived from the ellipse is employed, if corrugations are put into the walls in order to strengthen the tube and give it greater resistance and resiliency, those corrugations must necessarily be comparatively shallow considered in relation to the longer transverse axis of the ellipse of the cross-section. Thus, in the drawing, Fig. 3, the depth of the corrugations is such that from the line of the inside of the tube at the base of the corrugation to the inside of the tube at the depth of the corrugation is only a little more than twice the thickness of the tube, and the transverse diameter of the tube, measuring on its longer axis from A to B, is nearly four times as great as the vertical diameter of the tube on its shorter axis, and the depth of the corrugations C, D, F and J is only about one-fifteenth or one-sixteenth of the length of the longer transverse axis and only about one-fourth of the measurement of the short vertical axis of the tube. These corrugations C, D, F and J may therefore be considered as shallow corrugations, particularly as compared with the corrugations, if one may so call them, in the Bourdon patent to which reference has been made, for these corrugations are each of them deeper than the transverse diameter measurement across the arms standing at a right angle or at a greater angle than a right angle from each other. This reinforced tube is therefore one of considerable nicety to manufacture, and as it can be built so as to be bent around in a spiral form, and need not be twisted around its longitudinal axis, it is a useful tube, as experience has shown that the spiral form of Bourdon gives the most satisfactory results.

Having thus described my invention, what I claim, and desire to secure by Letters Patent, is—

1. A spring gage tube, the walls of which are of uniform thickness and the form of which is of a uniform flattened cross-section and generally, elliptic shape transversely, and which is provided upon its longer sides with shallow longitudinal corrugations of substantially the same thickness of wall as the other part of the walls of said tube, substantially as and for the purpose described.

2. The flattened Bourdon tube having a comparatively long transverse axis from A to B, a comparatively short vertical axis from G to H, and comparatively shallow corrugations upon one or more of the flattened sides of the tube, as shown, said corrugations being less deep on their interior than the measurement of the vertical axis of the tube, substantially as and for the purpose described.

CHAS. A. G. WINTHER.

Witnesses:
F. F. RAYMOND, 2d.,
J. M. DOLAN.